United States Patent
Föjer et al.

(10) Patent No.: US 10,472,692 B2
(45) Date of Patent: Nov. 12, 2019

(54) METHOD FOR MANUFACTURING A HIGH STRENGTH STEEL SHEET HAVING IMPROVED FORMABILITY AND DUCTILITY AND SHEET OBTAINED

(71) Applicant: ArcelorMittal, Luxembourg (LU)

(72) Inventors: Gunhild Föjer, Destelbergen (BE); Michel Soler, Maizieres-les-Metz (FR); Jean-Christophe Hell, Maizieres-les-Metz (FR)

(73) Assignee: ArcelorMittal, Luxembourg (LU)

(*) Notice: Subject to any disclaimer, the term of this patent is extended or adjusted under 35 U.S.C. 154(b) by 277 days.

(21) Appl. No.: 15/323,091

(22) PCT Filed: Jul. 3, 2015

(86) PCT No.: PCT/IB2015/055036
§ 371 (c)(1),
(2) Date: Dec. 29, 2016

(87) PCT Pub. No.: WO2016/001892
PCT Pub. Date: Jan. 7, 2016

(65) Prior Publication Data
US 2017/0159143 A1 Jun. 8, 2017

(30) Foreign Application Priority Data

Jul. 3, 2014 (WO) .................. PCT/IB2014/002293

(51) Int. Cl.
| | |
|---|---|
| C21D 1/18 | (2006.01) |
| C21D 6/00 | (2006.01) |
| C21D 8/02 | (2006.01) |
| C21D 9/46 | (2006.01) |
| C22C 38/02 | (2006.01) |
| C22C 38/04 | (2006.01) |

(52) U.S. Cl.
CPC ............. *C21D 8/0205* (2013.01); *C21D 1/18* (2013.01); *C21D 6/00* (2013.01); *C21D 8/0226* (2013.01); *C21D 8/0236* (2013.01); *C21D 9/46* (2013.01); *C22C 38/02* (2013.01); *C22C 38/04* (2013.01)

(58) Field of Classification Search
None
See application file for complete search history.

(56) References Cited

U.S. PATENT DOCUMENTS

| | | |
|---|---|---|
| 8,840,834 B2 | 9/2014 | Matsuda et al. |
| 9,103,008 B2 | 8/2015 | Beguinot et al. |
| 9,109,273 B2 | 8/2015 | Jin et al. |
| 9,121,087 B2 | 9/2015 | Matsuda et al. |
| 9,200,343 B2 | 12/2015 | Matsuda et al. |
| 9,580,779 B2 | 2/2017 | Kawasaki et al. |
| 9,617,614 B2 | 4/2017 | Hasegawa et al. |
| 2005/0224143 A1 | 10/2005 | Takabe et al. |
| 2006/0011274 A1 | 1/2006 | Speer et al. |
| 2011/0146852 A1* | 6/2011 | Matsuda .................. C21D 6/00 148/533 |
| 2011/0186189 A1 | 8/2011 | Futamura |
| 2013/0295402 A1 | 11/2013 | Oh et al. |
| 2014/0360632 A1* | 12/2014 | Hasegawa ................ C21D 9/46 148/533 |
| 2015/0203947 A1 | 7/2015 | Hasegawa et al. |

FOREIGN PATENT DOCUMENTS

| | | |
|---|---|---|
| CN | 101376945 A | 3/2009 |
| CN | 101638749 A | 2/2010 |
| CN | 101932745 A | 12/2010 |
| CN | 102149840 A | 8/2011 |
| CN | 102912219 A | 2/2013 |
| CN | 103392022 A | 11/2013 |
| EP | 2325346 A1 | 5/2011 |

(Continued)

OTHER PUBLICATIONS

Wen Long Cui et al.: "Study of Ultra-long Life Fatigue of High Strength Steel with Duplex-Phase of Carbide-Free Bainite and Martensite", Materials Sceince Forum, vol. 539-543, Jan. 1, 2007, pp. 4532-4537.

Wang Xu et al.: "Heat Treatment Process for Transformation Induced Plasticity (TRIP) Steel", Jinshu Rechuli—Heat Treatment of Metals, Zhongguo Jixie Gongcheng Xuehui, Rechuli Xuehui, Beijing, CN, No. 6, Jan. 1, 1995, pp. 14-17, Abstract.

Emmanuel De Moor et al.: "Effect of Carbon and Maganese on the Quenching and Partitioning Response of CMnSi Steels", ISIJ International, vol. 51, No. 1, Jan. 1, 2011, pp. 137-144.

(Continued)

*Primary Examiner* — Colin W. Slifka
(74) *Attorney, Agent, or Firm* — Davidson, Davidson & Kappel, LLC

(57) ABSTRACT

A method for manufacturing a high-strength sheet having improved formability and ductility accord which the chemical composition of the steel contains, in percent by weight: 0.25%<C≤0.4% 2.3%≤Mn≤3.5% 2.3%≤Si≤3% Al≤0.040% the remainder being Fe and unavoidable impurities, the method comprising the steps of annealing a rolled sheet made of said steel by soaking it at an annealing temperature AT higher than the $Ac_3$ transformation point of the steel, quenching the sheet by cooling it down to a quenching temperature QT between Ms−65° C. and Ms−115° C., being in order to obtain a final structure containing at least 65% of martensite and at least 5% of residual austenite, the sum of the ferrite and bainite contents being less than 10%, Ms being the Ms transformation point of the steel according to the Andrews formula, heating the sheet up to an overaging temperature PT between 360° C. and 500° C. and maintaining it at said temperature for a time Pt between 10 s and 600 s, and cooling the sheet down to the ambient temperature.

26 Claims, No Drawings

(56) References Cited

FOREIGN PATENT DOCUMENTS

| | | | | | |
|---|---|---|---|---|---|
| EP | 2327810 | A1 | 6/2011 | | |
| EP | 2546375 | A1 | 1/2013 | | |
| EP | 2546382 | A1 | 1/2013 | | |
| EP | 2660345 | A2 | 6/2013 | | |
| EP | 2660345 | A2 | * 11/2013 | ............... | C21D 8/00 |
| EP | 2772556 | A4 | 9/2014 | | |
| EP | 2881481 | A1 | 6/2015 | | |
| JP | H06128631 | A | 5/1994 | | |
| JP | 2003138345 | A | 5/2003 | | |
| JP | 2010090475 | A | 4/2010 | | |
| JP | 2011523442 | A | 8/2011 | | |
| JP | 2011184756 | A | 9/2011 | | |
| JP | 2013076162 | A | 4/2013 | | |
| JP | 2013237923 | A | 11/2013 | | |
| JP | 2014025091 | A | 2/2014 | | |
| KR | 20120070739 | A | 7/2012 | | |
| KR | 20120071583 | A | 7/2012 | | |
| RU | 2307876 | C2 | 10/2007 | | |
| RU | 2463373 | C2 | 10/2012 | | |
| RU | 2474623 | C1 | 2/2013 | | |
| RU | 2491357 | C1 | 8/2013 | | |
| WO | 2013061545 | A1 | 5/2013 | | |
| WO | WO 2013061545 | A1 | * 5/2013 | ............... | C21D 9/46 |
| WO | 2014020640 | A1 | 2/2014 | | |

OTHER PUBLICATIONS

Zhao H; Shi J; Li N; Wang C; Hu J; Hui W; Cao W: "Effects of Si on the Microstructure and Mechanical Property of Medium Mn Steel Treated by Quenching and Partitioning Process", Chinese Journal of Materials Research, vol. 25, No. 1, Feb. 1, 2011, pp. 45-50, Abstract.

Huseyin Aydin et al.: "Effect of Intercritical Heat Treatment on the Microstructure and Mechanical Properties of Medium Steels", ISIJ International, vol. 53, No. 10, Jan. 1, 2013, pp. 1871-1880.

Seawoong Lee et al.: "On the Selection of the Optimal Intercritical Annealing Temperature for Medium TRIP Steel"Metallurgical and Materials Transactions A, vol. 44, No. 11, Jul. 17, 2013, pp. 5018-5024.

John G Speer et al: "Analysis of Microstructure Evolution in Quenching and Partitioning Automotive Sheet Steel," Metallurgical and Materials Transactions A, Sep. 15, 2011 Springer-Verlag, New York, vol. 42, Nr:12, pp. 3591-3601.

Bouaziz el al.:"Driving Force and Logic of Development of Advanced High Strength Steels for Automotive Applications," steel research international, Jun. 11, 2013.

Thomas et al."Alloy design for fundamental study of quenched and partitioned steels," Materials Science & Technology Conference & Exhibition, Columbus, OH, United States, Oct. 16-20, pp. 552-567, Oct. 16-20, 2011.

De Moor et al: "Quench and Partitioning response of a Mo-alloyed CMnSi steel," New developments on metallurgy and applications of high strength steels : Buenos Aires 2008 ; international conference, May 26-28, Hilton Hotel, Buenos Aires, Argentina, May 26, 2008; May 26, 2008-May 28, 2008.

Zhao Hui et al: "Effect of Silicon on the Microstructure and Mechanical Properties of Quenched and Partitioned Medium Manganese Steel", Chinese Journal of Materials Research, vol. 25 , Issue 1, pp. 45-50, Feb. 28, 2011.

Wang Xu et al.: "Heat Treatment Process for Transformation Induced Plasticity (TRIP) Steel", Jinshu Rechuli—Heat Treatment of Metals, Zhongguo Jixie Gongcheng Xuehui, Rechuli Xuehui, Beijing, CN, No. 6, Jan. 1, 1995, pp. 14-17.

Singh, A. K. et al., "Prediction and Control of Center-Line Segregation in Continuously Cast Slabs", ISISTM Conference, 2013.

* cited by examiner

METHOD FOR MANUFACTURING A HIGH STRENGTH STEEL SHEET HAVING IMPROVED FORMABILITY AND DUCTILITY AND SHEET OBTAINED

The present invention relates to high-strength steel sheets excellent in formability, ductility and strength and to a method for producing the same.

To manufacture various equipments such as automotive parts, trailers, trucks and so on, high strength steel sheets, made of steels such as DP (dual phase) or TRIP (transformation induced plasticity) steels are used.

In order to reduce the weight of the equipments, which is very advisable in order to reduce the energy consumption, it is desirable to have steels having better mechanical properties such as yield strength or tensile strength. But such steels should have a good formability and a good ductility.

For this purpose it was proposed to use steels containing about 0.2% C, 2.5% Mn, 1.5% Si and having a structure consisting of martensite and retained austenite. The sheets are produced on continuous annealing lines by a heat treatment consisting on an annealing, an interrupted quenching and an overaging. The purpose of the overaging is to generate a carbon enrichment of the retained austenite by transfer from the martensite in order to increase the stability of the retained austenite. In these steels, the Mn content remains always less than 3.5%. Although with such steels it is possible to obtain interesting properties, it remains a clear objective to obtain retained austenite having a better stability in order to obtain better characteristics. But the ductility which is necessary to have a good formability should remain at a high level, especially a very good stretch flangeability is very helpful. More specifically, it is desirable to have a sheet having a yield strength higher than 1050 MPa, an uniform elongation of at least 10% and a stretch flangeability corresponding to a hole expansion ratio HER measured according to ISO standard 16630:2009 of at least 25. In this respect, it should be noted that, due to the differences between the methods of measure, the hole expansion ratio HER measured according to the ISO standard 16630:2009 is not comparable to the hole expansion ratio $\lambda$ measured according to JFS T 1001 (Japan Iron and Steel Federation standard).

For this purpose, the invention relates to a method for manufacturing a high-strength steel sheet having an improved formability according to which the chemical composition of the steel contains, in percent by weight:
  $0.25\% < C \leq 0.4\%$
  $2.3\% \leq Mn \leq 3.5\%$
  $2.3\% \leq Si \leq 3.0\%$
  $Al \leq 0.040\%$
the reminder being Fe and unavoidable impurities, the method comprising the steps of:
  hot rolling a sheet made of said steel to obtain a hot rolled steel sheet,
  batch annealing said hot rolled steel sheet between 400° C. and 700° C. for a time between 300 seconds to 10 hours,
  cold rolling said hot rolled and batch annealed steel sheet to obtain a cold rolled steel sheet,
  annealing said cold rolled steel sheet by soaking it at an annealing temperature AT higher than the transformation point of the steel $Ac_3 + 20°$ C., and less than 1100° C.,
  quenching the sheet by cooling it down to a quenching temperature QT between Ms−65° C. and Ms−115° C., Ms being the Ms transformation point of the steel according to the Andrews formula, in order to obtain a structure containing at least 65% and preferably more than 75% of martensite and at least 15% of residual austenite, the sum of ferrite and bainite being less than 10%,
  heating the sheet up to an overaging temperature PT between 360° C. and 500° C. and maintaining it at said temperature for a time Pt between 10 s and 600 s and,
  cooling the sheet down to the room temperature.

For example, the sheet is maintained at the overaging temperature PT for a time Pt between 300 s and 600 s.

Preferably, the method further comprises, between hot-rolling and batch annealing, a step of coiling the hot rolled steel sheet. The hot rolled steel sheet is coiled at a coiling temperature which is preferably comprised between 350° C. and 580° C.

The batch annealing is preferably performed at a temperature between 525° C. and 700° C., preferably between 550° C. and 700° C., for example between 550° C. and 650° C.

Preferably, the batch annealing is performed for a time between 4 hours to 10 hours.

Preferably, the sheet is cooled to the quenching temperature QT in order to obtain a final structure containing at least 75% of martensite.

For example, the sheet is cooled to the quenching temperature QT in order to obtain a final structure containing at least 20% of residual austenite.

Preferably, the chemical composition of the steel is such that $2.3\% \leq Si \leq 2.5\%$.

Preferably, the composition of the steel is such that $0.25\% < C \leq 0.35\%$, and $2.4\% \leq Mn \leq 2.7\%$.

Preferably, the annealing temperature AT is greater than 860° C. and less than 950° C., the quenching temperature QT is between 200° C. and 260° C. and the overaging temperature is between 370° C. and 430° C.

Preferably, the chemical composition of the steel contains:
  $0.25\% < C \leq 0.35\%$
  $2.4\% \leq Mn \leq 2.7\%$
  $2.3\% \leq Si \leq 2.5\%$
  $Al \leq 0.040\%$
and the annealing temperature AT is greater than 860° C. and less than 950° C., the quenching temperature QT is between 200° C. and 260° C. and the overaging temperature is between 370° C. and 430° C.

Optionally, the sheet can be furthered coated for example by hot dip coating with or without alloying.

Preferably, the sheet is maintained at said overaging temperature PT for a time Pt between 10 s and 200 s, and is hot-dip coated at a temperature comprised between 450° C. and 490° C. before being cooled down to the room temperature.

The invention also relates to a high-tensile steel sheet made of steel which chemical composition contains in percent by weight:
  $0.25\% < C \leq 0.4\%$
  $2.3\% \leq Mn \leq 3.5\%$
  $2.3\% \leq Si \leq 3\%$
  $Al \leq 0.040\%$
the remainder being Fe and unavoidable impurities, the steel having a structure containing more than 65% and preferably more than 75% of martensite, at least 15%, preferably at least 20% of retained austenite, and less than 10% of the sum ferrite and bainite.

Preferably, the chemical composition of the steel is such that $2.3\% \leq Si \leq 2.5\%$.

Preferably, the composition of the steel is such that 0.25%<C≤0.35%, and 2.4%≤Mn≤2.7%.

Preferably, the chemical composition of the steel contains:

0.25%<C≤0.35%
2.4%≤Mn≤2.7%
2.3%≤Si≤2.5%
Al≤0.040%

The yield strength YS can be greater than or equal to 1050 MPa, the tensile strength greater than or equal to 1300 MPa, the uniform elongation UE greater than or equal to 10%, the total elongation greater than or equal to 13%, and the hole expansion ratio HER greater than or equal to 25%. Generally, the tensile strength is less than 2000 MPa.

Optionally, at least one face of the sheet is coated.

The invention will now be described in details and illustrated by examples without introducing limitations.

The composition of the steel according to the invention comprises, in weight percent:

0.25%<C≤0.4% and preferably 0.25%<C≤0.35% in order to obtain a satisfactory strength and to improve the stability of the retained austenite. If the carbon content is too high, the weldability is reduced.

2.3%≤Mn≤3.5%. The Mn content is higher than 2.3% and preferably higher than 2.4% in order to have a sufficient hardenability in order to be able to obtain a structure comprising at least 75% of martensite and to have a tensile strength of at least 1100 Mpa. But, the manganese content must remain less than 3.5%, and preferably less than 2.7% in order not to have too much segregation which is detrimental for the stretch flangeability.

Si≥2.3%, and Si≤3% and preferably Si≤2.5%. Silicon is useful to stabilize the austenite, to provide solid solution strengthening and to delay the formation of carbides during carbon redistribution from martensite to austenite during overaging. But at a too high silicon content, silicon oxides will form at the surface of the sheet which is detrimental to coatability.

The reminder is Fe and impurities resulting from the melting. Such impurities include N, S, P and residual elements such as Cr, Ni, Mo, Cu, B and Al.

Usually, the N content remains less than 0.01%, the S content less than 0.01%, the P content less than 0.02%, the Cr content less than 0.1%, the Ni content less than 0.1%, the Mo content less than 0.05%, the Cu content less than 0.2%, the B content less than 0.0010% and the Al content less than 0.02%. However, it must be noted that Al may be added in order to deoxidize the steel. In this case, its content can reach 0.04%. Moreover, Al can form small precipitates of AlN which can be used to limit the austenitic grain growth during annealing.

No micro-alloying, such as Ti, V, and Nb, is targeted in the steel according to the invention. Such elements contents are limited individually to 0.050%, preferably, the sum of Nb, Ti, V is limited to 0.1%.

Hot rolled sheet having a thickness between 2 and 5 mm can be produced in a known manner for this steel. As an example, the reheating temperature before rolling can be between 1200° C. and 1280° C., preferably about 1250° C., the finish rolling temperature is preferably less than 850° C., the start cooling temperature less than 800° C., the stop cooling temperature between 570° C. and 590° C. and the coiling has to be made between 350° C. and 580° C.

According to a first embodiment, the coiling is performed at a coiling temperature between 350° C. and 450° C., preferably between 375° C. and 450° C. According to a second embodiment, the coiling is performed at a coiling temperature between 450° C. and 580° C., preferably between 540° C. and 580° C.

After hot rolling, the sheet is batch annealed at a temperature between 400° C. and 700° C. for 300 seconds to 10 hours, preferably for 4 hours to 10 hours. The batch annealing, by tempering the steel sheet, improves the cold-rollability of the hot-rolled and coiled steel sheet.

The hot rolled sheet can be pickled and cold rolled to obtain a cold rolled sheet having a thickness between 0.5 mm and 2 mm.

Then, the sheet is heat treated on a continuous annealing line.

Before the heat treatment, an optimum quenching temperature QTop is determined. This optimum quenching temperature is the temperature at which the quenching has to be stopped in order to obtain an optimum content of retained austenite.

To determine this theoretical optimal quenching temperature QTop, the Andrews and the Koistinen Marburger relationships can be used. These relationships are:

$$Ms = 539 - 423 \times C - 30.4 \times Mn - 12.1 \times Cr - 7.5 \times Mo - 7.5 \times Si$$

and:

$$f\alpha' = 1 - \exp\{-0.011 \times (Ms - QT)\}$$

$f\alpha'$ is the proportion of martensite obtained during quenching at the temperature QT. To determine the proportion of residual austenite after overaging and cooling down to the room temperature after quenching down to the quenching temperature QT, it is assumed that, after quenching, the sheet is overaged at a temperature higher than QT during a time sufficient to cause a sufficient partitioning of carbon between the martensite and the austenite with as low as possible formation of ferrite and bainite. It is also assumed that, after overaging, the sheet is cooled down to the room temperature.

Those which are skilled in the art know how to calculate the proportion of residual austenite and the theoretical optimal quenching temperature QTop which is the quenching temperature for which the proportion of residual austenite is maximal.

The theoretical optimal quenching temperature QTop is not necessarily the quenching temperature QT at which the quench has to be stopped.

The purpose of the heat treatment is to obtain a structure consisting of at least 65% and preferably at least 75% of martensite and at least 15% and preferably at least 20% of retained austenite with as little as possible of ferrite or bainite. The sum of ferrite and bainite surface fraction is less than 10% and preferably less than 5%.

The proportions of martensite, ferrite and bainite are area fractions of these constituents. The proportion of residual austenite is measured by X-RAY diffraction. Those who are skilled in the art know how to determine these proportions.

To make this heat treatment, the sheet is annealed at an annealing temperature AT higher than the $Ac_3$ transformation point of the steel and preferably equal or higher than $Ac_3 + 20°$ C. in order to have a completely austenite structure but less than 1100° C. and preferably less than 950° C. in order not to coarsen too much the austenite grains.

When the annealing is finished, the steel is quenched by cooling down to a quenching temperature QT at which the cooling is stopped. Then the sheet is heated to an overaging temperature PT at which it is maintained during an overaging time Pt before being cooled down to the room temperature or to be hot dip coated with or without alloying such as galvanizing, galvannealing or coating by aluminum alloys.

For the quenching, the cooling speed has to be sufficiently high to avoid the formation of ferrite or bainite. In this respect, a cooling speed greater than 10° C./s is enough.

The quenching temperature QT is less than the Ms transformation point of the steel to ensure that the obtained structure is martensite and retained austenite.

The quenching temperature QT is such that the retained austenite content is sufficient to obtain the desired properties.

In the present invention, the quenching temperature QT is preferably between QTop+45° C. and QTop−5° C. As, for the steel of the present invention, QTop is about equal to Ms−110° C., therefore the quenching temperature QT can be chosen between Ms−65° C. and Ms−115° C., Ms being the Ms calculated using the Andrews formula.

The overaging temperature PT is between 360° C. and 500° C., for example between 360° C. and 460° C., and the overaging time Pt is between 10 s and 600 s, for example between 300 s and 600 s.

With such heat treatment, the obtained structure of the steel contains at least 65% and even more than 75% of martensite and at least 15% of residual austenite, the sum of the ferrite and bainite contents remaining less than 10%. The content of residual austenite can be even greater than 20% and the sum of ferrite and bainite can even be less than 5%.

The martensite, ferrite and bainite contents are fraction areas and the austenite content is measured by X-Ray diffraction.

Optionally, between the overaging and the cooling down to the ambient (or room) temperature, the sheet can be hot dip coated for example galvanized or galvannealed. For this, the temperature of the sheet at the end of the overaging is adjusted to the hot dip coating bath temperature, for example 470° C. (+/−10° C.) for zinc coating.

In particular, if the sheet is hot dip coated after the overaging step and before cooling the sheet down to the ambient temperature, the heat treatment corresponding to the hot dip and eventually to the alloying have to be considered, which implies that the overaging time Pt is shortened in consequence. Thus, when the sheet is hot dip coated after the overaging step and before cooling the sheet down to the ambient temperature, the overaging time Pt may be as low as 10 s, and up to 200 s.

For a steel having the following preferable composition: 0.25%<C≤0.35%, 2.4%≤Mn≤2.7%, 2.3%≤Si≤2.5%, the reminder being Fe and impurities, the annealing temperature is preferably greater than 860° C. and less than 950° C., the quenching temperature QT is preferably between 200° C. and 260° C. and the overaging temperature is preferably between 370° C. and 430° C.

Such sheet has a yield YS strength greater than 1050 MPa, a tensile strength TS greater than 1300 MPa, a uniform elongation UE greater than or equal to 10% and a hole expansion ratio HER measured according to ISO standard 16630:2009, greater than or equal to 25%.

As example and comparison, three steels corresponding to casts H118, H117 and H115 were produced. The compositions, the transformation points and the theoretical optional temperatures of the steels are reported in table I.

TABLE I

| Cast | C % | Si % | Mn % | P % | S % | Al % | $Ac_1$ °C. | $Ac_3$ °C. | Ms °C. | QTop °C. | γ % |
|---|---|---|---|---|---|---|---|---|---|---|---|
| H118 | 0.293 | 2.4 | 2.5 | 0.0015 | 0.0045 | 0.006 | 777 | 842 | 321 | 210 | 29 |
| H117 | 0.297 | 1.5 | 2.5 | 0.0013 | 0.0044 | 0.006 | 750 | 810 | 326 | 215 | 29 |
| H115 | 0.293 | 1.6 | 3.3 | 0.0013 | 0.0047 | 0.014 | 757 | 806 | 302 | 195 | 30 |

In this table, $Ac_1$ and $Ac_3$ temperatures are measured by dilatometry, Ms is the value calculated using the Andrews formula, QTop is the theoretical optimal quenching temperature and γ % is the calculated fraction of residual austenite corresponding to QTop.

The sheets having a thickness of 1 mm were obtained by hot and cold rolling.

For the hot rolling, the reheating temperature was 1250° C., the finish rolling temperature was less than 850° C., the start cooling temperature for the water spray cooling was less than 800° C., the stop cooling temperature was between 570° C. and 590° C. and the coiling was made at 560° C.

The hot rolled sheet whose thickness was 2.5 mm was batch annealed at a temperature of 550° C. for 10 h. The hot rolled sheet was then cold rolled to obtain a cold rolled sheet having a thickness of 1 mm.

Twenty one samples were taken in the sheets and were heat treated. For each cast, some samples were annealed above $Ac_3$ and the others under $Ac_3$ for a time of about 180 s, then quenched down to quenching temperatures QT equal to QTop, QTop−20° C., QTop+20° C. and QTop+40° C., and were overaged at 350° C. or 400° C. for 100 s or 500 s.

The conditions of the heat treatments and the obtained results are reported in table II.

TABLE II

| Ex | Cast | AT °C. | QT °C. | PT °C. | Pt s | γ % | YS Mpa | TS Mpa | UE % | HER % |
|---|---|---|---|---|---|---|---|---|---|---|
| 1 | H118 | 880 | 190 | 400 | 500 | 18 | 1220 | 1390 | 5 | |
| 2 | H118 | 880 | 210 | 400 | 500 | 18 | 1175 | 1385 | 10 | 29 |
| 3 | H118 | 880 | 230 | 400 | 500 | 18 | 1100 | 1380 | 10.5 | |
| 4 | H118 | 880 | 250 | 400 | 500 | 17 | 1050 | 1365 | 14 | |
| 5 | H118 | 880 | 210 | 400 | 100 | 16 | 1170 | 1430 | 8 | |
| 6 | H118 | 880 | 210 | 350 | 500 | 16 | 1175 | 1430 | 5 | |
| 7 | H118 | 820 | 210 | 400 | 500 | 24 | 750 | 1420 | 14 | |
| 8 | H117 | 840 | 195 | 400 | 500 | 14 | 1200 | 1340 | 5 | |
| 9 | H117 | 840 | 215 | 400 | 500 | 14 | 1150 | 1310 | 6 | 32 |
| 10 | H117 | 840 | 235 | 400 | 500 | 16 | 1110 | 1310 | 8 | — |
| 11 | H117 | 840 | 255 | 400 | 500 | 16 | 1040 | 1275 | 9 | |
| 12 | H117 | 840 | 215 | 400 | 100 | 16 | 1120 | 1330 | 5 | |
| 13 | H117 | 840 | 215 | 350 | 500 | 9 | 1150 | 1360 | 2 | |
| 14 | H117 | 790 | 215 | 400 | 500 | 13 | 940 | 1275 | 12 | |
| 15 | H115 | 820 | 175 | 400 | 500 | 17 | 1040 | 1420 | 10 | |
| 16 | H115 | 820 | 195 | 400 | 500 | 19 | 1200 | 1430 | 10 | 11 |
| 17 | H115 | 820 | 215 | 400 | 500 | 18 | 915 | 1490 | 9.5 | |
| 18 | H115 | 820 | 235 | 400 | 500 | 17 | 850 | 1550 | 6 | |
| 19 | H115 | 820 | 195 | 400 | 100 | 20 | 1000 | 1500 | 10 | |
| 20 | H115 | 820 | 195 | 350 | 500 | 19 | 1000 | 1500 | 10 | |
| 21 | H115 | 760 | 195 | 400 | 500 | 20 | 710 | 1390 | 2 | |

In this table, γ % is the residual austenite contents as measured on the sample by X-Ray diffraction, YS is the yield strength, TS the tensile strength, UE the uniform elongation and HER the hole expansion ratio according the ISO standard.

Examples 8 to 21 show that with casts H115 and H117, the desired results are not obtained.

Example 2, 3 and 4 shows that a yield strength of more than 1050 MPa, a tensile strength of more than 1300 MPa, a uniform elongation of at least 10% and can be obtained with cast H118, with an annealing temperature higher than $Ac_3$, a quenching temperature QT between MS−65° C. and Ms−115° C. equal to the optimal quenching temperature QTop, an averaging temperature of about 400° C. and an overaging time of about 500 s. Example 2 shows that a hole expansion ratio of more than 25% can be obtained.

But the example 1 shows that if the quenching temperature is too low, at least the uniform elongation is not sufficient.

Examples 5, 6 and 7 show that, if the overaging time is too low, or the overaging temperature is too low, in absence of a further hot-dip coating step, or if the annealing temperature is under $Ac_3$, the desired results are not obtained.

The sheet which is described above is not coated. But it is clear that the sheet may be coated by any means i.e. by hot dip coating, by electro-coating, by vacuum coating such as JVD or PVD and so on. When the sheet is hot dip coated, the coating can be galvanizing with or without alloying (galva-nealing). In these cases, the heat treatment corresponding to the hot dip and eventually to the alloying which are made before cooling the sheet down to the ambient temperature have to be considered. Those which are skilled in the art know how to do that, for example by tests, in order to optimize the overaging temperature and time. In this case, at least one face of the sheet can be coated and more specifically metallic coated.

The invention claimed is:

1. A method for manufacturing a steel sheet comprising the steps of:
   providing a steel sheet having a chemical composition including, in percent by weight:
   0.25%<C≤0.4%;
   2.3%≤Mn≤3.5%;
   2.3%≤Si≤3%; and
   Al≤0.040%;
   a remainder being Fe and unavoidable impurities;
   hot rolling the steel sheet to obtain a hot rolled steel sheet;
   batch annealing the hot rolled steel sheet between 400° C. and 700° C. for a time between 300 seconds to 10 hours, to obtain a hot rolled and batch annealed steel sheet;
   cold rolling the hot rolled and batch annealed steel sheet to obtain a cold rolled steel sheet;
   annealing the cold rolled steel sheet by soaking the cold rolled steel sheet at an annealing temperature AT higher than $Ac_3+20°$ C., and less than 1100° C.;
   quenching the cold rolled steel sheet by cooling the cold rolled steel sheet down to a quenching temperature QT between Ms−65° C. and Ms−115° C., in order to obtain a final structure including at least 65% martensite and at least 15% residual austenite, a sum of ferrite and bainite being less than 10%, Ms being an Ms transformation point of the steel according to Andrews formula;
   heating the cold rolled steel sheet up to an overaging temperature PT between 360° C. and 500° C. and maintaining the cold rolled steel sheet at the overaging temperature PT for a time Pt between 300 s and 600 s, to obtain a steel sheet; and
   cooling the steel sheet down to room temperature.

2. The method according to claim 1, further comprising, after the hot-rolling step and before the batch annealing step, a step of coiling the hot rolled steel sheet.

3. The method according to claim 2, wherein the hot rolled steel sheet is coiled at a coiling temperature between 350° C. and 580° C.

4. The method according to claim 1, wherein the batch annealing is performed at a temperature between 525° C. and 700° C.

5. The method according to claim 1, wherein the batch annealing is performed for a time between 4 hours and 10 hours.

6. The method according to claim 1, wherein the cold rolled steel sheet is cooled to the quenching temperature QT in order to obtain a final structure including at least 75% of martensite.

7. The method according to claim 1, wherein the cold rolled steel sheet is cooled to the quenching temperature QT in order to obtain a final structure including at least 20% of residual austenite.

8. The method according to claim 1, wherein the chemical composition of the steel includes 2.3%≤Si≤2.5%.

9. The method according to claim 1, wherein the chemical composition of the steel includes:
   0.25%<C≤0.35%; and
   2.4%≤Mn≤2.7%.

10. The method according to claim 1, wherein the annealing temperature AT is greater than 860° C. and less than 950° C., the quenching temperature QT is between 200° C. and 260° C., and the overaging temperature PT is between 370° C. and 430° C.

11. A method for manufacturing a steel sheet comprising the steps of:
    providing a steel sheet having a chemical composition including, in percent by weight:
    0.25%<C≤0.4%;
    2.3%≤Mn≤3.5%;
    2.3%≤Si≤3%; and
    Al≤0.040%;
    a remainder being Fe and unavoidable impurities;
    hot rolling the steel sheet to obtain a hot rolled steel sheet;
    batch annealing the hot rolled steel sheet between 400° C. and 700° C. for a time between 300 seconds to 10 hours;
    cold rolling the hot rolled and batch annealed steel sheet to obtain a cold rolled steel sheet;
    annealing the cold rolled steel sheet by soaking the cold rolled steel sheet at an annealing temperature AT higher than $Ac_3+20°$ C. and less than 1100° C.;
    quenching the cold rolled steel sheet by cooling the cold rolled steel sheet down to a quenching temperature QT between Ms−65° C. and Ms−115° C., in order to obtain a final structure including at least 65% of martensite and at least 15% of residual austenite, a sum of ferrite and bainite being less than 10%, Ms being a Ms transformation point of the steel according to Andrews formula;
    heating the cold rolled steel sheet up to an overaging temperature PT between 360° C. and 500° C. and maintaining the cold rolled steel sheet at the overaging temperature PT for a time Pt between 10 s and 200 s, to obtain a steel sheet;
    hot-dip coating the steel sheet at a temperature between 450° C. and 490° C.; and
    cooling the steel sheet down to room temperature.

12. The method according to claim 11, further comprising, after the hot-rolling step and before the batch annealing step, a step of coiling the hot rolled steel sheet.

13. The method according to claim 12, wherein the hot rolled steel sheet is coiled at a coiling temperature between 350° C. and 580° C.

14. The method according to claim 11, wherein the batch annealing is performed at a temperature between 525° C. and 700° C.

15. The method according to claim 11, wherein the batch annealing is performed for a time between 4 hours and 10 hours.

16. The method according to claim 11, wherein the cold rolled steel sheet is cooled to the quenching temperature QT in order to obtain a final structure including at least 75% of martensite.

17. The method according to claim 11, wherein the cold rolled steel sheet is cooled to the quenching temperature QT in order to obtain a final structure including at least 20% of residual austenite.

18. The method according to claim 11, wherein the chemical composition of the steel includes $2.3\% \leq Si \leq 2.5\%$.

19. The method according to claim 11, wherein the chemical composition of the steel includes:
$0.25\% < C \leq 0.35\%$; and
$2.4\% \leq Mn \leq 2.7\%$.

20. The method according to claim 11, wherein the annealing temperature AT is greater than 860° C. and less than 950° C., the quenching temperature QT is between 200° C. and 260° C., the overaging temperature PT is between 370° C. and 430° C.

21. A steel sheet comprising:
a chemical composition including in percent by weight:
$0.25\% < C \leq 0.4\%$;
$2.3\% \leq Mn \leq 3.5\%$;
$2.3\% \leq Si \leq 3\%$; and
$Al \leq 0.040\%$;
a remainder being Fe and unavoidable impurities; and
a structure including more than 65% martensite, more than 15% retained austenite and less than 10% of a sum of ferrite and bainite,
the steel sheet having a yield strength YS greater than or equal to 1050 MPa, a tensile strength greater than or equal to 1300 MPa, a uniform elongation UE greater than or equal to 10%, and a hole expansion ratio HER greater than or equal to 25%.

22. The steel sheet according to claim 21, wherein the structure includes at least 75% of martensite.

23. The steel sheet according to claim 21, wherein the structure contains at least 20% of residual austenite.

24. The steel sheet according to claim 21, wherein the chemical composition of the steel includes $2.3\% \leq Si \leq 2.5\%$.

25. The steel sheet according to claim 21, wherein the chemical composition of the steel includes:
$0.25\% < C \leq 0.35\%$; and
$2.4\% \leq Mn \leq 2.7\%$.

26. The steel sheet according to claim 21, wherein at least one face of the steel sheet is coated.

* * * * *